(12) United States Patent
Sun et al.

(10) Patent No.: US 10,977,317 B2
(45) Date of Patent: Apr. 13, 2021

(54) SEARCH RESULT DISPLAYING METHOD AND APPARATUS

(71) Applicant: BEIJING BAIDU NETCOM SCIENCE AND TECHNOLOGY CO., LTD., Beijing (CN)

(72) Inventors: Ke Sun, Beijing (CN); Shuqi Sun, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 182 days.

(21) Appl. No.: 16/313,206

(22) PCT Filed: Aug. 24, 2016

(86) PCT No.: PCT/CN2016/096480
§ 371 (c)(1),
(2) Date: Dec. 26, 2018

(87) PCT Pub. No.: WO2018/000557
PCT Pub. Date: Jan. 4, 2018

(65) Prior Publication Data
US 2019/0155846 A1   May 23, 2019

(30) Foreign Application Priority Data
Jun. 30, 2016 (CN) .......................... 201610509333.6

(51) Int. Cl.
*G06F 16/30* (2019.01)
*G06F 16/906* (2019.01)
(Continued)

(52) U.S. Cl.
CPC .......... *G06F 16/906* (2019.01); *G06F 16/313* (2019.01); *G06F 16/3344* (2019.01); *G06F 16/9538* (2019.01)

(58) Field of Classification Search
CPC .. G06F 16/906; G06F 16/313; G06F 16/3344; G06F 16/9538
See application file for complete search history.

(56) References Cited

U.S. PATENT DOCUMENTS

2004/0093321 A1* 5/2004 Roustant ............. G06F 16/9535
2004/0220963 A1* 11/2004 Chen ..................... G06K 9/6218
(Continued)

FOREIGN PATENT DOCUMENTS

| CN | 101788988 A | 7/2010 |
| CN | 102693304 A | 9/2012 |
| CN | 103984705 A | 8/2014 |

OTHER PUBLICATIONS

PCT/CN2016/096480 English translation of International Search Report dated Apr. 1, 2017, 2 pages.
(Continued)

*Primary Examiner* — Mahesh H Dwivedi
(74) *Attorney, Agent, or Firm* — Lathrop GPM LLP

(57) ABSTRACT

The present disclosure discloses a search result displaying method and an apparatus. The method includes: obtaining a plurality of webpages according to a search request of a user, and performing proper noun recognition and word segmentation processing on a title of each webpage to obtain part-of-speech and extended information corresponding to a word segmentation result; determining core information of each webpage according to the part-of-speech and extended information corresponding to the word segmentation result; selecting webpages matching the search request from the plurality of webpages based on the core information of each webpage; and performing cluster analysis on the webpages matching the search request to generate a search result, and displaying the searching result to the user.

15 Claims, 6 Drawing Sheets

(51) Int. Cl.
*G06F 16/31* (2019.01)
*G06F 16/33* (2019.01)
*G06F 16/9538* (2019.01)

(56) References Cited

U.S. PATENT DOCUMENTS

| | | | | |
|---|---|---|---|---|
| 2006/0026152 | A1* | 2/2006 | Zeng | G06F 16/951 |
| 2007/0118514 | A1* | 5/2007 | Mariappan | G06F 16/951 |
| 2007/0239676 | A1* | 10/2007 | Stonehocker | G06F 3/0482 |
| 2009/0019026 | A1* | 1/2009 | Valdes-Perez | G06F 16/285 |
| 2010/0030552 | A1* | 2/2010 | Chen | G06F 16/367 |
| | | | | 704/9 |
| 2010/0185689 | A1* | 7/2010 | Hu | G06F 40/289 |
| | | | | 707/803 |
| 2011/0238663 | A1* | 9/2011 | Zhang | G06F 16/367 |
| | | | | 707/736 |
| 2013/0151936 | A1* | 6/2013 | Hsu | G06F 16/957 |
| | | | | 715/205 |
| 2013/0185074 | A1* | 7/2013 | Gruber | G06F 16/9537 |
| | | | | 704/257 |
| 2014/0006012 | A1* | 1/2014 | Zhou | G06F 16/3344 |
| | | | | 704/9 |
| 2014/0172412 | A1* | 6/2014 | Viegas | G06F 16/951 |
| | | | | 704/9 |
| 2015/0142812 | A1* | 5/2015 | Ma | G06N 20/00 |
| | | | | 707/739 |
| 2015/0193441 | A1* | 7/2015 | Jamrog | G06F 16/24578 |
| | | | | 707/748 |
| 2016/0294862 | A1* | 10/2016 | Tao | H04L 63/1416 |
| 2017/0060509 | A1* | 3/2017 | Tulasi | G06F 40/169 |
| 2017/0147691 | A1* | 5/2017 | Li | G06F 16/951 |
| 2019/0163714 | A1* | 5/2019 | Ma | G06F 16/953 |
| 2019/0286676 | A1* | 9/2019 | Fatzinger | G06N 5/04 |

OTHER PUBLICATIONS

PCT/CN2016/096480 English translation Written Opinion dated Apr. 1, 2017, 7 pages.
Chinese Patent Application No. 201610509333.6 Office Action dated Jul. 22, 2019, 9 pages.
Chinese Patent Application No. 201610509333.6 English translation of Office Action dated Jul. 22, 2019, 10 pages.

* cited by examiner

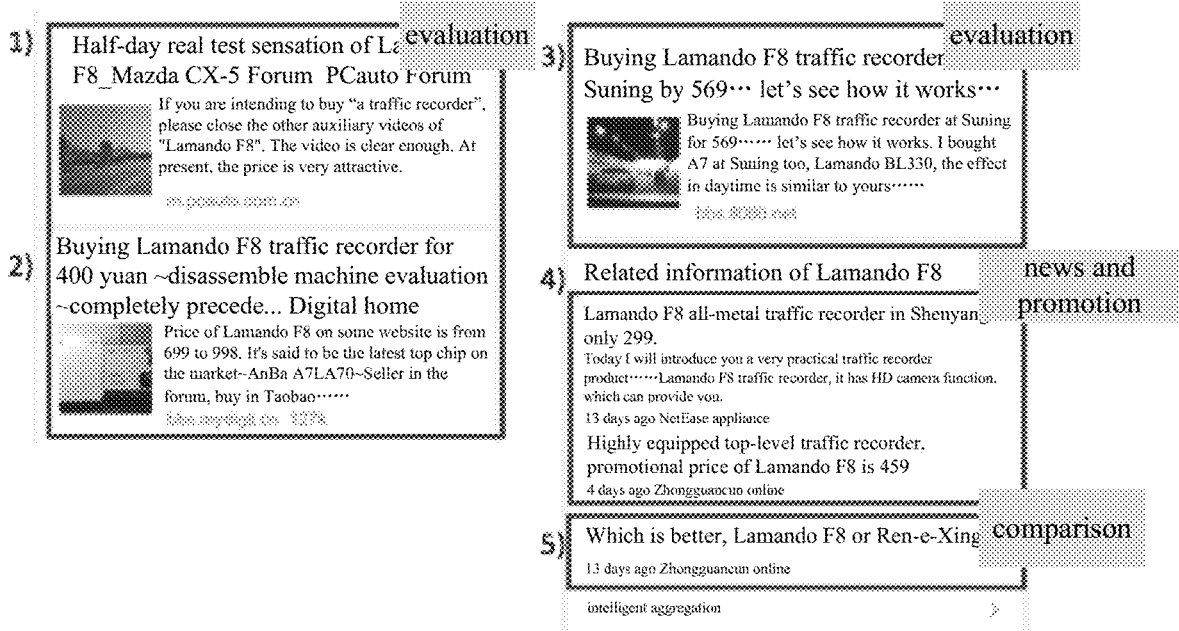

Fig. 1 a plurality of webpages are obtained according to a search request of a user, proper noun recognition and word segmentation processing are performed on a title of each webpage to obtain part-of-speech and extended information corresponding to a word segmentation result — S101 core information of each webpage is determined according to the part-of-speech and extended information corresponding to the word segmentation result — S102 webpages matching the search request are selected from the plurality of webpages based on the core information of each webpage — S103 cluster analysis is performed on the webpages matching the search request to generate a search result, and the searching result is displayed to the user — S104

Fig. 2

| Lamando F8 | traffic recorder | after spending | one night | does not start with the vehicle | Baidu knows |
|---|---|---|---|---|---|
| product proper noun | noun concept | verb | time adverb | field verb | website proper noun |

Fig. 6

*Lamando F8 — product proper noun*
*traffic recorder — noun concept*
*one night — time adverb*
*Baidu konws — website proper noun*

Fig. 7

| type | word | description |
|---|---|---|
| core proper noun | Lamando F8 | must exist |
| core concept word | traffic recorder (removed) | havin a type consistent with the type of the core proper noun, therefore, it can be removed.<br>if not consistent, it should be reserved<br>for example, "engine" in "engine of BMW X5 ignites" should be reserved. |
| core verb | does not start with the vehicle | |
| other modifier element | after spending one night | verb+time adverb<br>may be further combined into a verb segment |

Fig. 8

SEARCH RESULT DISPLAYING METHOD AND APPARATUS

CROSS-REFERENCE TO RELATED APPLICATION

This application is a US national phase application based upon International Application No. PCT/CN2016/096480, filed on Aug. 24, 2016, which is based on and claims priority to Chinese Patent Application Serial No. 201610509333.6, titled "search results display method and apparatus" filed on Jun. 30, 2016, the entire content of which is incorporated herein by reference.

FIELD

The present disclosure relates to a field of information processing, and more particularly to a search result displaying method and an apparatus.

BACKGROUND

With the development of internet technology, a search engine is taken as a main way for searching network information by users. For example, a user may search for "Lamando F8" in a search engine to obtain search results related to "Lamando F8".

However, in the related art, as illustrated in FIG. 1, after the user input "Lamando F8" in the search engine, search results obtained according to "Lamando F8" by the search engine are concentrated on evaluation of "Lingdu F8". Therefore, the search engine only provides evaluation and price information of "Lingdu F8" to the user, and the search results provided by the search engine are not rich enough, with a high repetitive rate.

SUMMARY

Embodiments of a first aspect of the present disclosure provide a search result displaying method, including: obtaining a plurality of webpages according to a search request of a user, performing proper noun recognition and word segmentation processing on a title of each webpage to obtain part-of-speech and extended information corresponding to a word segmentation result; determining core information of each webpage according to the part-of-speech and extended information corresponding to the word segmentation result; selecting webpages matching the search request from the plurality of webpages based on the core information of each webpage; and performing cluster analysis on the webpages matching the search request to generate a search result, and displaying the searching result to the user.

Embodiments of a second aspect of the present disclosure provide a search result displaying device, including: a first obtaining module, configured to obtain a plurality of webpages according to a search request of a user, to perform proper noun recognition and word segmentation processing on a title of each webpage to obtain part-of-speech and extended information corresponding to a word segmentation result; a second obtaining module, configured to determine core information of each webpage according to the part-of-speech and extended information corresponding to the word segmentation result; a selecting module, configured to select webpages matching the search request from the plurality of webpages based on the core information of each webpage; and a cluster module, configured to perform cluster analysis on the webpages matching the search request to generate a search result, and to display the searching result to the user.

Embodiments of a third aspect of the present disclosure provide an apparatus, including: one or more processors; a memory; one or more programs, stored in the memory, when executed by the one or more processors, configured to perform following actions: obtaining a plurality of webpages according to a search request of a user, performing proper noun recognition and word segmentation processing on a title of each webpage to obtain part-of-speech and extended information corresponding to a word segmentation result; determining core information of each webpage according to the part-of-speech and extended information corresponding to the word segmentation result; selecting webpages matching the search request from the plurality of webpages based on the core information of each webpage; and performing cluster analysis on the webpages matching the search request to generate a search result, and displaying the searching result to the user.

Embodiments of a fourth aspect of the present disclosure provide a non-transitory computer-readable storage medium, having one or more programs stored thereon, when the one or more programs are executed by an apparatus, the apparatus performs following actions: obtaining a plurality of webpages according to a search request of a user, performing proper noun recognition and word segmentation processing on a title of each webpage to obtain part-of-speech and extended information corresponding to a word segmentation result; determining core information of each webpage according to the part-of-speech and extended information corresponding to the word segmentation result; selecting webpages matching the search request from the plurality of webpages based on the core information of each webpage; and performing cluster analysis on the webpages matching the search request to generate a search result, and displaying the searching result to the user.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which:

FIG. 1 is a schematic diagram illustrating a search result displaying interface in the related art.

FIG. 2 is a flow chart of a search result displaying method according to an embodiment of the present disclosure.

FIG. 6-FIG. 8 are schematic diagrams illustrating determining core information of each webpage according to the part-of-speech and extended information corresponding to the word segmentation result according to an embodiment of the present disclosure.

DETAILED DESCRIPTION

Figure 3:
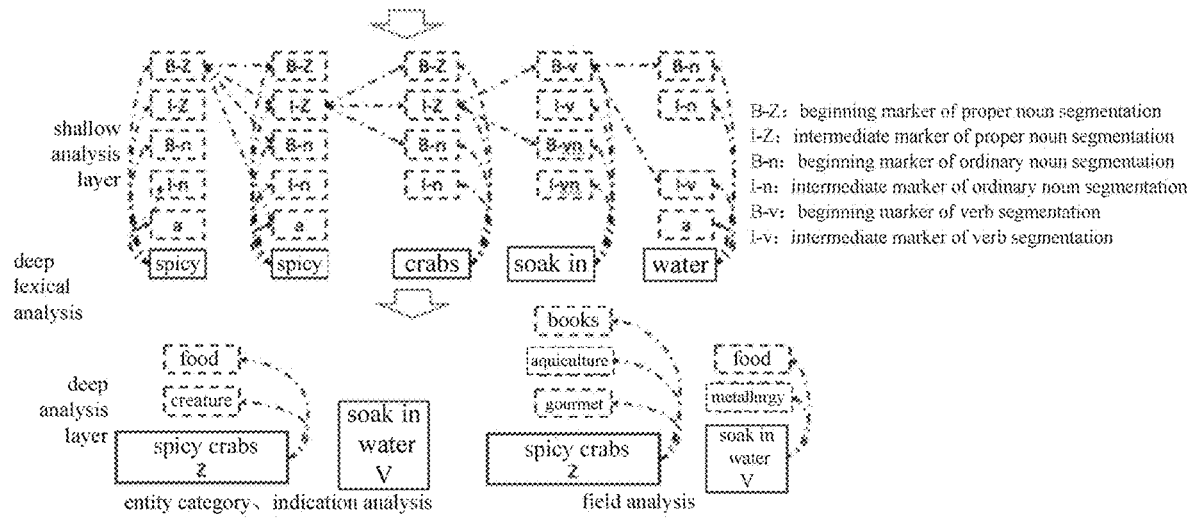
FIG. 3 is a schematic diagram illustrating obtaining part-of-speech and extended information corresponding to a word segmentation result via a deep lexical analysis according to an embodiment of the present disclosure.

Reference will be made in detail to embodiments of the present disclosure. Examples of the embodiments of the present disclosure will be shown in drawings, in which the same or similar elements and the elements having same or similar functions are denoted by like reference numerals throughout the descriptions. The embodiments described herein according to drawings are explanatory, illustrative, and used to generally understand the present disclosure, not construed to limit the present disclosure.

A search result displaying method and device according to embodiments of the present disclosure will be descripted with reference to drawings in the following.

FIG. 2 is a flow chart of a search result displaying method according to an embodiment of the present disclosure.

As illustrated in FIG. 2, the search result displaying method includes following actions.

At block S101, a plurality of webpages are obtained according to a search request of a user, proper noun recognition and word segmentation processing are performed on a title of each webpage to obtain part-of-speech and extended information corresponding to a word segmentation result.

Generally, after a search engine in the related art obtains a plurality of webpages according to a search request of a user, the search engine just obtains webpages matching the search request based on analysis on words used in content of the webpages, and provides the webpages to the user. For example, the search request of the user is "Lamando F8", the search engine may displays a certain number of webpages with webpage title containing "Lamando F8" as search results on a display interface (such as a screen of a mobile phone). Thus it may cause a high repetition rate of core viewpoints of the webpages in the search results provided to the user on a limited real interface at one time, and effective information provided to the user is limited.

To provide richer and more diversified search results to the user on the limited real interface at one time, embodiments of the present disclosure provide a search result displaying method. By performing a pragmatic level analysis on the plurality of webpages obtained based on the search request of the user, analyzing the plurality of webpages obtained based on the search request of the user by analyzing and understanding basic functions (such as being a noun or a verb, etc.) of related words in a text and fields of the related words, search results with richer and more diversified core viewpoints are generated and displayed to the user based on an analysis result.

In detail, in practical application, the plurality of webpages are obtained according to the search request of the user, the proper noun recognition and the word segmentation processing are performed on the title of each webpage to obtain the part-of-speech and the extended information corresponding to the word segmentation result. The part-of-speech may include a noun, a verb, an adverb, a proper noun, or the like. The extended information may include a proper noun category, indication analysis of a proper noun, or word field analysis.

It should be understood that, the above-mentioned proper noun category focuses on a category attribute (a static attribute) that exists in an entity itself, such as a person, a location, an organization, a creature, an object, virtual works, etc., with a goal to be able to dynamically identify a specific category of a certain proper noun in a current context.

The indication analysis of a proper noun focuses on what a hot entity specifically refers to, with a goal to search out correct and unambiguous description pages (all called entries) of a current proper noun in a knowledge base (such as encyclopedia, freebase, wikipedia), and to associate and uniquely identify the proper noun through a certain knowledge base.

The word field analysis focuses on an application demand, with a goal to analyze which application scenario or which vertical website a word is more likely to be used in the current context.

Based on above description, it should be understood that, in the search result displaying method according to embodiments of the present disclosure, the proper noun recognition and the word segmentation processing are performed on the title of each webpage via a deep lexical analysis technology, and the part-of-speech and the extended information corresponding to the word segmentation result are obtained. For example, by performing the proper noun recognition and the word segmentation processing on a webpage title "soak spicy crabs in water" via the deep lexical analysis technology to obtain the part-of-speech and the extended information corresponding to the word segmentation result, a work process of the deep lexical analysis technology will be described in detail with reference to FIG. 3 in the following.

As illustrated in FIG. 3, the deep lexical analysis technology includes a shallow analysis layer and a deep analysis layer. In the shallow analysis layer, shallow lexical information, such as a category granularity and a lexical function of a word, is focused on. The webpage title "soak spicy crabs in water" is parsed as "soak", "spicy", "crabs", "in", and "water" via the shallow analysis layer. Tasks such as granularity merging and part-of-speech recognition are completed through steps of integration and appropriate adjustment at one time. That is, "soak", "spicy", "crabs", "in", "water" are merged as word segmentations "spicy crabs" and "soak in water" with a larger granularity, and part-of-speech of "spicy crabs" and "soak in water" is obtained.

As illustrated in FIG. 3, during the processing process of the shallow analysis layer, the proper noun category (such as traditional PER (person), LOC (location), ORG (organization), and FOOD and VIDEO unique to a current search engine) is abstracted into a greater proper noun category Z as a whole, so as to reduce load of a target space, and focus the target on the shallow lexical analysis part.

Then, in the deep analysis layer, deep analysis is performed on the word segmentation result, i.e., "spicy crabs" and "soak in water", with a larger granularity obtained in the shallow analysis layer, and the extended information such as the proper noun category, the indication analysis of a proper noun, the word field analysis corresponding to the word segmentation result is obtained. As illustrated in FIG. 3, the obtained extended information is "food", "creature", "books", "aquiculture", "gourmet", etc.

It should be noted that, manners for performing the proper noun recognition and the word segmentation processing on the title of each webpage to obtain the part-of-speech and the extended information corresponding to the word segmentation result varies according to specific application scenarios.

For a first example, after the plurality of webpages are obtained according to the search request of the user, the proper noun recognition and the word segmentation processing are first performed on the title of each webpage, and then the part-of-speech and the extended information corresponding to each proper noun are obtained. Then each proper noun and its corresponding part-of-speech and extended information are merged to obtain the proper noun of each webpage title and corresponding part-of-speech and extended information.

For a second example, performing the proper noun recognition and the word segmentation processing on the title of webpages and obtaining the part-of-speech and the extended information corresponding to the word segmentation result are completed at one time. That is, the part-of-speech and the extended information corresponding to the word segmentation result are obtained at the same time the proper noun recognition and the word segmentation processing are performed on the title of the webpages.

For a third example, during the processing method illustrated in FIG. 3, performing the proper noun recognition and the word segmentation processing on the title of the webpages and obtaining the part-of-speech corresponding to the word segmentation result are first completed at one time, then the extended information corresponding to the word segmentation result is obtained according to the processing result.

At block S102, core information of each webpage is determined according to the part-of-speech and extended information corresponding to the word segmentation result.

In detail, the related words of the webpage title included in the obtained part-of-speech and extended information corresponding to the word segmentation result are information such as nouns, verbs, and word fields. For various words in the webpage title, words that have no actual word attributes (such as an auxiliary word "of") in the webpage titles may be filtered, or words with same part-of-speech and extended information are filtered, with one of them left. Such that words that have actual word attributes and whose part-of-speech and extended information are not repeated in the webpage title and corresponding part-of-speech and extended information are determined as the core information of each webpage.

For example, after performing word segmentation on a webpage with a webpage title "Lamando F8 traffic recorder", two word segments "Lamando F8" and "traffic recorder" are obtained after the word segmentation. Lamando F8 is an traffic recorder, therefore, "traffic recorder" and information related to "traffic recorder" may be filtered, and the core information of the webpage is determined as "Lamando F8" and part-of-speech and extended information corresponding to "Lamando F8".

At block S103, webpages matching the search request are selected from the plurality of webpages based on the core information of each webpage.

At block S104, cluster analysis is performed on the webpages matching the search request to generate a search result, and the searching result is displayed to the user.

In detail, in order to save displaying space and to provide richer information on the display interface to the user as much as possible, the cluster analysis is performed on the webpages matching the search request after the webpages matching the search request are selected from the plurality of webpages based on the core information of each webpage, such that webpages with a same viewpoint are clustered into one category after webpages matching the search request are selected from the plurality of webpages based on the core information of each webpage, avoiding to repeatedly display webpages having same core viewpoints to the user. Thereby, by generating the search results according to a result of the cluster analysis, and by displaying the search results to the user, only information related one of the webpages in one category is displayed in the search results.

Figure 4:
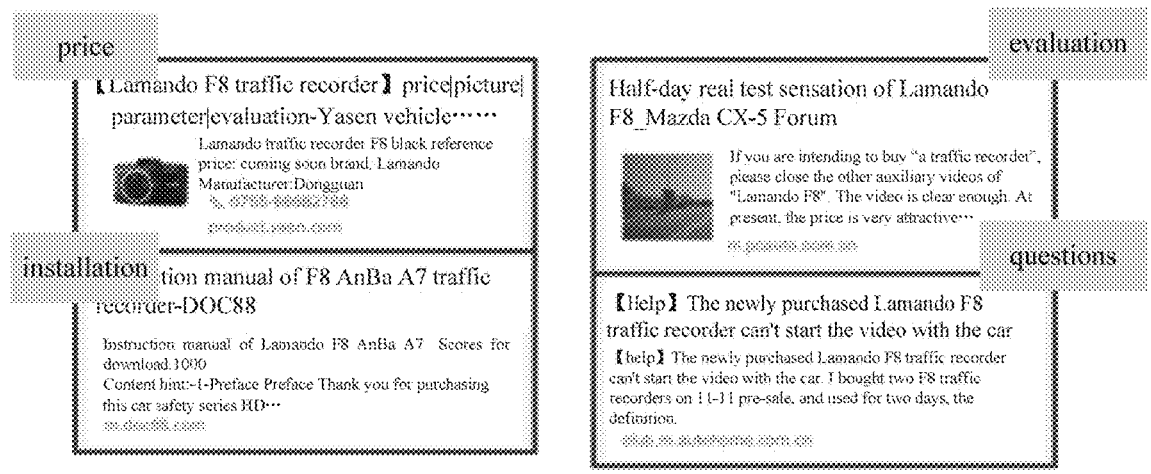
FIG. 4 is a schematic diagram illustrating a search result displaying interface according to an embodiment of the present disclosure.

The search results include webpage information with a plurality of categories of core information. As illustrated in FIG. 4, the cluster analysis is performed on the webpages matching the search request "Lamando F8", the search results displayed to the user are search results with various core viewpoints, such as prices, evaluation, installation, questions about Lamando F8.

In an embodiment of the present disclosure, in order to further enrich the search results, to make the display interface contain richer webpage information at one time, when only information related one of the plurality of webpages in one category is displayed, other webpages belongs to this category may be hidden, and this hidden event may be associated with a related trigger menu, such that the user may obtain the related information of other hidden webpages in the category through an operation on the related trigger menu. For example, the user may obtain information of other hidden webpage in the category by clicking a "+" menu at a top right corner of a certain clustered webpage area in the search results.

In conclusion, with the search result displaying method according to embodiments of the present disclosure, the plurality of webpages are obtained according to the search request of the user, the proper noun recognition and the word segmentation processing are preformed on the title of each webpage to obtain the part-of-speech and extended information corresponding to the word segmentation result, the core information of each webpage are determined according to the part-of-speech and the extended information corresponding to the word segmentation result, the webpages matching the search request are selected from the plurality of webpages based on the core information of each webpage, the cluster analysis is performed on the webpages matching the search request to generate the search result, and the searching result is displayed to the user. Therefore, by performing the cluster analysis on the webpages matching the search request, search results with richer core viewpoint and higher diversity are provided to the user.

Further, based on above embodiments, in order to more clearly illustrate the search result displaying method according to the embodiment of the present disclosure, the search result displaying method will be exemplarily described with reference to FIG. 5, FIG. 6-8 in the following, taking the core information being a core proper noun, a core verb, and a core concept word as an example.

Figure 5:
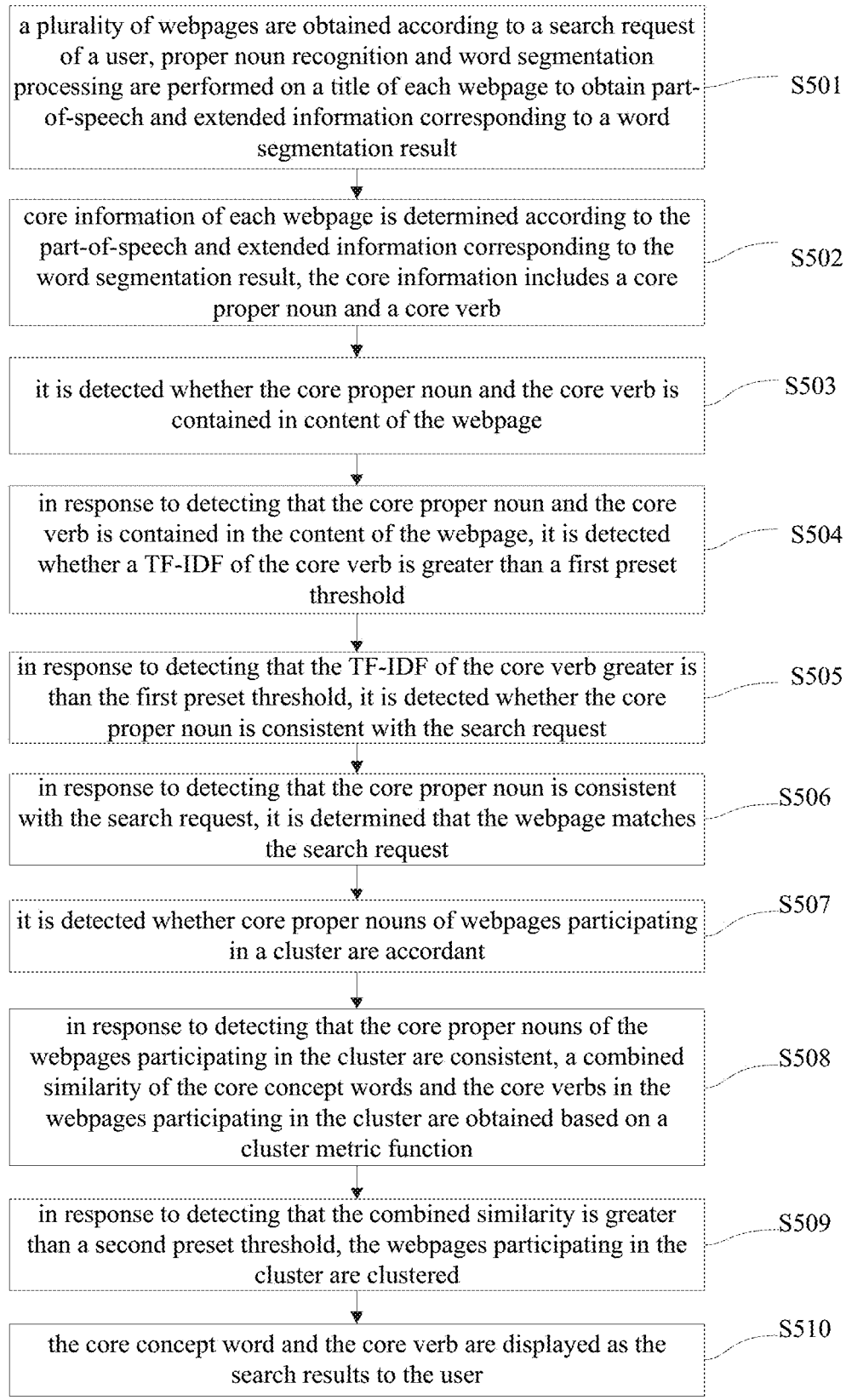
FIG. 5 is a flow chart of a search result displaying method according to a detailed embodiment of the present disclosure.

FIG. 5 is a flow chart of a search result displaying method according to a detailed embodiment of the present disclosure. As illustrated in FIG. 5, the method includes following actions.

At block S501, a plurality of webpages are obtained according to a search request of a user, proper noun recognition and word segmentation processing are performed on a title of each webpage to obtain part-of-speech and extended information corresponding to a word segmentation result.

At block S502, core information of each webpage is determined according to the part-of-speech and extended information corresponding to the word segmentation result, the core information includes a core proper noun and a core verb.

It should be noted that, the core proper noun may be a name of an entity that the title of the webpage mainly describes. The core verb may be a main action of the entity that the title of the webpage mainly describes. For example, a core proper noun of a webpage with a title "an apple cultivation method" is "apple", a core verb of the webpage is "cultivation".

In detail, a core proper noun and a core verb of each webpage are determined according to the part-of-speech and the extended information corresponding to the word segmentation result, and a core viewpoint described by the webpage is extracted.

In order to more clearly describe how to determine the core information of each webpage according to the part-of-speech and the extended information corresponding to the word segmentation result according to embodiments of the present disclosure, a work process of extracting the core information of a webpage will be exemplarily described with reference to FIG. 6-8. As illustrated in FIG. 6, based on a deep lexical analysis technology, lexical annotation is performed on a title of the webpage. The word segmentation processing is performed on the title of the webpage "Lamando F8 traffic recorder does not start with the vehicle after spending one night—Baidu knows", and the part-of-speech and the extended information of each word segment are annotated as: "Lamando F8" is the core proper noun, and the like.

Thereby, a result illustrated as FIG. 7 is obtained by extracting words that have actual word attributes or words that are proper nouns from the part-of-speech and the extended information of each word segment of the title of the webpage.

Further, after the words that have actual word attributes or words that are proper nouns are extracted, the core viewpoint of the webpage, illustrated as FIG. 8, may be determined. As illustrated in FIG. 8, the core proper noun of the webpage is "Lamando F8", and the core verb of the webpage is "does not start with the vehicle".

At block S503, it is detected whether the core proper noun and the core verb is contained in content of the webpage.

In detail, a title of a webpage may not match content of the webpage sometimes. For example, a title of a webpage is "an apple cultivation method", while content of the webpage may mainly describe "growing area of apple". Therefore, there is a need to detect whether corresponding webpage content contains the core proper noun and the core verb according to the core information of each webpage, so as to judge whether the webpage content described information related to the title of the webpage.

At block S504, in response to detecting that the core proper noun and the core verb is contained in the content of the webpage, it is detected whether a term frequency-inverse document frequency (TF-IDF) of the core verb is greater than a first preset threshold.

In detail, in order to ensure that there is a great relevance between content described in the webpage and the title of the webpage and to ensure quality of the obtained webpage, it may further be detected whether the TF-IDF of the core verb is greater than the first preset threshold. That is, it is detected whether the content of the webpage contains a relatively large amount of content that relates to the title of the webpage.

The TF-IDF, a weighting technology commonly used in information retrieval and data mining, is a statistics method, used to evaluate an importance level of a word for one file set or one file in a corpus. Influence of commonly used words, such as influence of a commonly used auxiliary word "of", may be weakened through the TF-IDF, thus accurately evaluating the importance level of the core verb in webpage content.

At block S505, in response to detecting that the TF-IDF of the core verb is greater than the first preset threshold, it is detected whether the core proper noun is consistent with the search request.

At block S506, in response to detecting that the core proper noun is consistent with the search request, it is determined that the webpage matches the search request.

In detail, if the TF-IDF of the core verb is greater than the first preset threshold, it indicates that the content of the webpage describes content related to the title of the webpage in detail, for example, content of a webpage with a tile "an apple cultivation method" describes an apple cultivation method in detail. Webpages with the TF-IDF of the core verb greater than the first preset threshold are high quality webpages.

Further, in order to maximize a possibility of filtering out webpages that hit a noise webpage and ensure recall of related webpages, to ensure that the system can recall more diversified page results for a same number of recalls, it is detected whether the core proper noun is consistent with the search request in the above mentioned high quality webpages. If the core proper noun is consistent with the search request, it is determined that the webpage matches the search request.

At block S507, it is detected whether core proper nouns of webpages participating in a cluster are consistent.

In detail, in order to perform an accurate cluster analysis on the obtained webpages matching the search request to avoid that webpages having different core information are clustered into one category, it is detected whether core proper nouns of webpages participating in the cluster are consistent.

At block S508, in response to detecting that the core proper nouns of the webpages participating in the cluster are consistent, a combined similarity of the core concept words and the core verbs in the webpages participating in the cluster are obtained based on a cluster metric function.

At block S509, in response to detecting that the combined similarity is greater than a second preset threshold, the webpages participating in the cluster are clustered.

In detail, if the core proper nouns of the webpages participating in the cluster are consistent, it indicates that the webpages describes an entity. Thereby, the combined similarity of the core concept words and the core verbs in the webpages is analyzed based on the cluster metric function so as to further determine which aspect of the core proper noun the webpage describes. If the combined similarity is greater than the second preset threshold, it indicates that the webpages participating in the cluster describe a same aspect of the entity corresponding to the core proper noun, thus the webpages participating in the cluster are clustered.

The core concept word and the core verb in a webpage may represent an aspect of an entity described by the webpage content.

The core concept word may be a noun concept consistent with the core proper noun. For example, as illustrated in FIG. 8, the core concept word is "traffic recorder", which is consistent with the core proper noun "Lamando F8". Both the core concept word and the core proper noun describe "Lamando F8". Thereby, for the webpages participating in the cluster whose core concept word and the core proper noun are consistent, the core concept word may be removed when the combined similarity of the core concept words and the core verbs in the webpages is calculated, thus only a similarity of the core verb in the webpages is calculated.

The core concept word may be a noun concept different from the core proper noun. For example, a title of a webpage is "engine of BMW X5 ignites", the core concept word "engine" is different from the core proper noun "BMW X5". Thereby, for the webpages participating in the cluster whose core concept word and the core proper noun are different, the core concept word may be reserved when the combined similarity of the core concept words and the core verbs in the webpages is calculated, and the combined similarity of the core concept words and the core verbs in the webpages is calculated.

At block S510, the core concept word and the core verb are displayed as the search results to the user.

In detail, in an embodiment of the present disclosure, the core concept word and the core verb are displayed as the search results to the user, such that the use may understand the core information of the search results more clearly.

In conclusion, with the search result displaying method according to embodiments of the present disclosure, it is detected whether the core proper noun and the core verb is contained in content of a corresponding webpage according to the core information of each webpage, the webpages matching the search request is obtained according to the value of the TF-IDF of the core verb, and the webpages with consistent core proper nouns and high combined similarity of the core concept words and the core verbs are clustered and displayed to the user, thus further ensuring that search results with richer core viewpoint and higher diversity are provided to the user.

Figure 9:
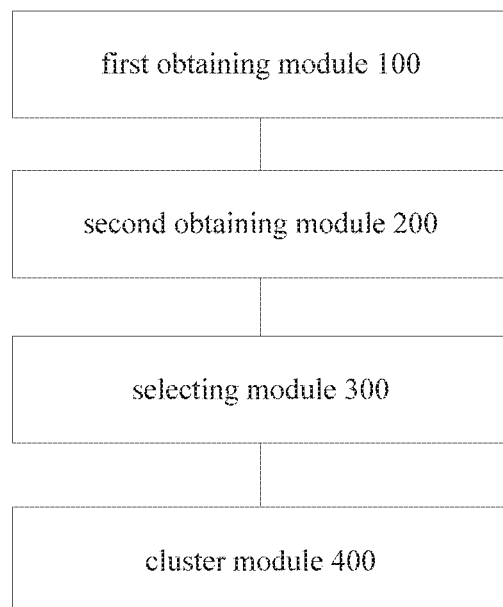
FIG. 9 is a block diagram illustrating a search result displaying device according to an embodiment of the present disclosure.

In order to realize above mentioned embodiments, the present disclosure further provides a search result displaying device. FIG. 9 is a block diagram illustrating a search result displaying device according to an embodiment of the present disclosure. As illustrated in FIG. 9, the search result displaying device includes a first obtaining module 100, a second obtaining module 200, a selecting module 300, and a cluster module 400.

The first obtaining module 100 is configured to obtain a plurality of webpages according to a search request of a user, to perform proper noun recognition and word segmentation processing on a title of each webpage to obtain part-of-speech and extended information corresponding to a word segmentation result.

In detail, in practical application, the first obtaining module 100 obtains the plurality of webpages according to the search request of the user, and performs the proper noun recognition and the word segmentation processing on the title of each webpage to obtain the part-of-speech and the extended information corresponding to the word segmentation result. The part-of-speech may include a noun, a verb, an adverb, a proper noun, or the like. The extended information may include a proper noun category, indication analysis of a proper noun, or word field analysis.

It should be understood that, the above-mentioned proper noun category focuses on a category attribute (a static attribute) that exists in an entity itself, such as a person, a location, an organization, a creature, an object, virtual works, etc., with a goal to be able to dynamically identify a specific category of a certain proper noun in a current context.

The indication analysis of a proper noun focuses on what a hot entity specifically refers to, with a goal to search out correct and unambiguous description pages (all called entries) of a current proper noun in a knowledge base (such as encyclopedia, freebase, wikipedia), and to associate and uniquely identify the proper noun through a certain knowledge base.

The word field analysis focuses on an application demand, with a goal to analyze which application scenario or which vertical website a word is more likely to be used in the current context.

The second obtaining module 200 is configured to determine core information of each webpage according to the part-of-speech and extended information corresponding to the word segmentation result.

In detail, the related words of the webpage title included in the obtained part-of-speech and extended information corresponding to the word segmentation result are information such as nouns, verbs, and word fields. For various words in the webpage title, the second obtaining module 200 may filter words that have no actual word attributes (such as an auxiliary word "of") in the webpage titles, or words with same part-of-speech and extended information, with one of them left. Such that words that have actual word attributes and whose part-of-speech and extended information are not repeated in the webpage title and corresponding part-of-speech and extended information are determined as the core information of each webpage.

The selecting module 300 is configured to select webpages matching the search request from the plurality of webpages based on the core information of each webpage.

The cluster module 400 is configured to perform cluster analysis on the webpages matching the search request to generate a search result, and to display the searching result to the user.

In detail, in order to save displaying space and to provide richer information on the display interface to the user as much as possible, the cluster module 400 performs the cluster analysis on the webpages matching the search request after the selecting module 300 selects the webpages matching the search request from the plurality of webpages based on the core information of each webpage, such that webpages with a same viewpoint are clustered into one category after webpages matching the search request are selected from the plurality of webpages based on the core information of each webpage, avoiding to repeatedly display webpages having same core viewpoints to the user. Thereby, by generating the search results according to a result of the cluster analysis, and by displaying the search results to the user, only information related one of the webpages in one category is displayed in the search results.

In conclusion, with the search result displaying device according to embodiments of the present disclosure, the plurality of webpages are obtained according to the search request of the user, the proper noun recognition and the word segmentation processing are preformed on the title of each webpage to obtain the part-of-speech and extended information corresponding to the word segmentation result, the core information of each webpage are determined according to the part-of-speech and the extended information corresponding to the word segmentation result, the webpages matching the search request are selected from the plurality of webpages based on the core information of each webpage, the cluster analysis is performed on the webpages matching the search request to generate the search result, and the searching result is displayed to the user. Therefore, by performing the cluster analysis on the webpages matching the search request, search results with richer core viewpoint and higher diversity are provided to the user.

Further, based on above embodiments, in order to more clearly illustrate the search result displaying device according to embodiments of the present disclosure more clearly, the search result displaying device will be exemplarily descripted with reference to FIG. 10 and FIG. 11 in the following, taking the core information being a core proper noun, a core verb, and a core concept word as an example.

Figure 10:
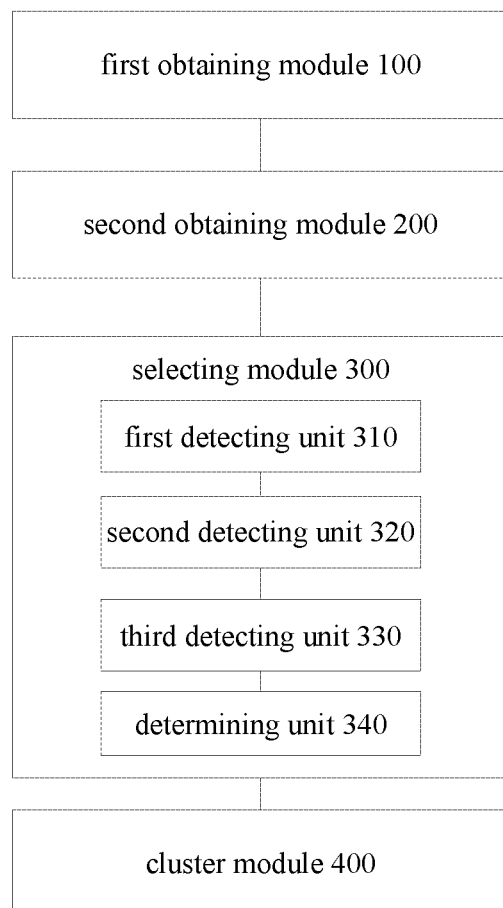
FIG. 10 is a block diagram illustrating a search result displaying device according to a detailed embodiment of the present disclosure.

FIG. 10 is a block diagram illustrating a search result displaying device according to a detailed embodiment of the present disclosure. As illustrated in FIG. 10, based on the description of FIG. 9, the selecting module 300 includes a first detecting unit 310, a second detecting unit 320, a third detecting unit 330, and a determining unit 340.

The first detecting unit 310 is configured to detect whether the core proper noun and the core verb is contained in content of the webpage.

In detail, a title of a webpage may not match content of the webpage sometimes. For example, a title of a webpage is "an apple cultivation method", while content of the webpage may mainly describe "growing area of apple". Therefore, the first detecting unit 310 may detect whether corresponding webpage content contains the core proper noun and the core verb according to the core information of each webpage, so as to judge whether the webpage content described information related to the title of the webpage.

The second detecting unit 320 is configured to, in response to detecting that the core proper noun and the core verb is contained in the content of the webpage, detect whether a term frequency-inverse document frequency (TF-IDF) of the core verb is greater than a first preset threshold.

In detail, in order to ensure that there is a great relevance between content described in the webpage and the title of the webpage and to ensure quality of the obtained webpage, the second detecting unit 320 may detect whether the TF-IDF of the core verb is greater than the first preset threshold. That is, it is detected whether the content of the webpage contains a relatively large amount of content that relates to the title of the webpage.

The third detecting unit 330 is configured to, in response to detecting that the TF-IDF of the core verb is greater than the first preset threshold, detect whether the core proper noun is consistent with the search request.

The determining unit 340 is configured to, in response to detecting that the core proper noun is consistent with the search request, determine that the webpage matches the search request.

In detail, if the TF-IDF of the core verb is greater than the first preset threshold, it indicates that the content of the webpage describes content related to the title of the webpage in detail, for example, content of a webpage with a tile "an apple cultivation method" describes an apple cultivation method in detail. Webpages with the TF-IDF of the core verb greater than the first preset threshold are high quality webpages.

Further, in order to maximize a possibility of filtering out webpages that hit a noise webpage and ensure recall of related webpages, to ensure that the system can recall more diversified page results for a same number of recalls, the third detecting unit 330 detects whether the core proper noun is consistent with the search request in the above mentioned high quality webpages. If the core proper noun is consistent with the search request, the determining unit 340 determines that the webpage matches the search request.

Figure 11:
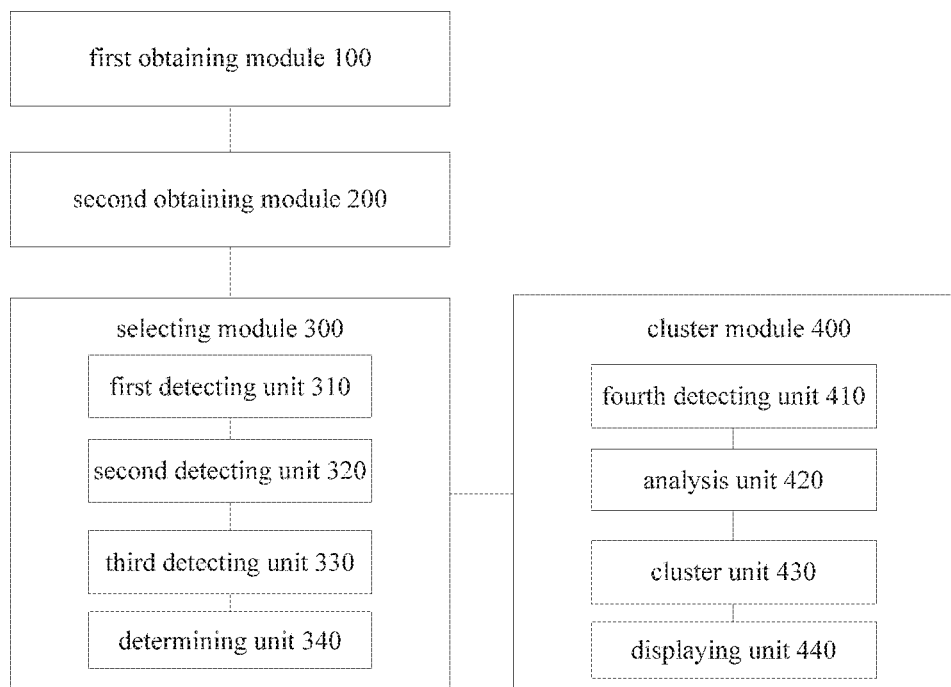
FIG. 11 is a block diagram illustrating a search result displaying device according to another embodiment of the present disclosure.

Further, FIG. 11 is a block diagram illustrating a search result displaying device according to another embodiment of the present disclosure. As illustrated in FIG. 11, based on the description of FIG. 10, the cluster module 400 includes a fourth detecting unit 410, an analysis unit 420, a cluster unit 430, and a displaying unit 440.

The fourth detecting unit 410 is configured to detect whether core proper nouns of webpages participating in a cluster are consistent.

In detail, in order to perform an accurate cluster analysis on the obtained webpages matching the search request to avoid that webpages having different core information are clustered into one category, the fourth detecting unit 410 detects whether core proper nouns of webpages participating in the cluster are consistent.

The analysis unit 420 is configured to, in response to detecting that the core proper nouns of the webpages participating in the cluster are consistent, obtain a combined similarity of the core concept words and the core verbs in the webpages participating in the cluster based on a cluster metric function.

The cluster unit 430 is configured to, in response to detecting that the combined similarity is greater than a second preset threshold, cluster the webpages participating in the cluster.

In detail, if the core proper nouns of the webpages participating in the cluster are consistent, it indicates that the webpages describes an entity. Thereby, the analysis unit 420 calculates the combined similarity of the core concept words and the core verbs in the webpages based on the cluster metric function so as to further determine which aspect of the core proper noun the webpage describes. If the combined similarity is greater than the second preset threshold, it indicates that the webpages participating in the cluster describe a same aspect of the entity corresponding to the core proper noun, thus the cluster unit 430 clusters the webpages participating in the cluster.

The displaying unit 440 is configured to display the core concept word and the core verb as a title of the search result to the user.

In detail, in an embodiment of the present disclosure, the displaying unit 440 displays the core concept word and the core verb as the search results to the user, such that the user may understand the core information of the search results more clearly.

It should be noted that, the search result displaying device according to embodiments of the present disclosure corresponds to the search result displaying method described in above FIG. 1-FIG. 6. Details not disclosed in this embodiment are not elaborate herein.

In conclusion, with the search result displaying method according to embodiments of the present disclosure, it is detected whether the core proper noun and the core verb is contained in content of a corresponding webpage according to the core information of each webpage, the webpages matching the search request is obtained according to the value of the TF-IDF of the core verb, and the webpages with consistent core proper nouns and high combined similarity of the core concept words and the core verbs are clustered and displayed to the user, thus further ensuring that search results with richer core viewpoint and higher diversity are provided to the user.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A search result displaying method, comprising:
obtaining a plurality of webpages according to a search request of a user, and performing proper noun recognition and word segmentation processing on a title of each webpage to obtain part-of-speech and extended information corresponding to a word segmentation result;
determining core information corresponding to each webpage according to the part-of-speech and extended information corresponding to the word segmentation result, wherein the core information further comprises a core concept word, a core proper noun and a core verb;
selecting webpages matching the search request from the plurality of webpages based on the core information corresponding to each webpage; and
performing cluster analysis on the webpages matching the search request to generate a search result comprising a plurality of categories of webpages, and displaying the searching result to the user by category; and
displaying the core concept word and the core verb as a title of the search result to the user.

2. The method according to claim 1, wherein, the part-of-speech comprises a noun, a verb, an adverb, or a proper noun, the extended information comprises a proper noun category, indication analysis of a proper noun, or word field analysis, the word field analysis is configured to analyze which application scenario or which vertical website a word is to be used in a current context.

3. The method according to claim 1, wherein,
selecting webpages matching the search request from the plurality of webpages based on the core information corresponding to each webpage comprises:
detecting whether the core proper noun and the core verb is contained in content of the webpage;
in response to detecting that the core proper noun and the core verb is contained in the content of the webpage, detecting whether a term frequency-inverse document frequency (TF-IDF) of the core verb is greater than a first preset threshold;
in response to detecting that the TF-IDF of the core verb is greater than the first preset threshold, detecting whether the core proper noun is consistent with the search request; and
in response to detecting that the core proper noun is consistent with the search request, determining that the webpage matches the search request.

4. The method according to claim 3, wherein performing the cluster analysis on the webpages matching the search request comprises:
detecting whether core proper nouns of webpages participating in a cluster are consistent;
in response to detecting that the core proper nouns of the webpages participating in the cluster are consistent, obtaining a combined similarity of the core concept words and the core verbs in the webpages participating in the cluster based on a cluster metric function; and
in response to detecting that the combined similarity is greater than a second preset threshold, clustering the webpages participating in the cluster.

5. The method according to claim 2, wherein,
selecting webpages matching the search request from the plurality of webpages based on the core information corresponding to each webpage comprises:
detecting whether the core proper noun and the core verb is contained in content of the webpage;
in response to detecting that the core proper noun and the core verb is contained in the content of the webpage, detecting whether a term frequency-inverse document frequency (TF-IDF) of the core verb is greater than a first preset threshold;
in response to detecting that the TF-IDF of the core verb is greater than the first preset threshold, detecting whether the core proper noun is consistent with the search request; and
in response to detecting that the core proper noun is consistent with the search request, determining that the webpage matches the search request.

6. An apparatus, comprising:
one or more processors;
a memory;
one or more programs, stored in the memory, when executed by the one or more processors, configured to perform following actions:
obtaining a plurality of webpages according to a search request of a user, performing proper noun recognition and word segmentation processing on a title of each webpage to obtain part-of-speech and extended information corresponding to a word segmentation result, wherein the core information further comprises a core concept word, a core proper noun and a core verb;
determining core information corresponding to each webpage according to the part-of-speech and extended information corresponding to the word segmentation result;
selecting webpages matching the search request from the plurality of webpages based on the core information corresponding to each webpage; and
performing cluster analysis on the webpages matching the search request to generate a search result comprising a plurality of categories of webpages, and displaying the searching result to the user by category; and
displaying the core concept word and the core verb as a title of the search result to the user.

7. The apparatus according to claim 6, wherein, the part-of-speech comprises a noun, a verb, an adverb, or a proper noun, the extended information comprises a proper noun category, indication analysis of a proper noun, or word field analysis, the word field analysis is configured to analyze which application scenario or which vertical website a word is to be used in a current context.

8. The apparatus according to claim 6, wherein,
selecting webpages matching the search request from the plurality of webpages based on the core information corresponding to each webpage comprises:
detecting whether the core proper noun and the core verb is contained in content of the webpage;
in response to detecting that the core proper noun and the core verb is contained in the content of the webpage, detecting whether a term frequency-inverse document frequency (TF-IDF) of the core verb is greater than a first preset threshold;

in response to detecting that the TF-IDF of the core verb is greater than the first preset threshold, detecting whether the core proper noun is consistent with the search request; and in response to detecting that the core proper noun is consistent with the search request, determining that the webpage matches the search request.

9. The apparatus according to claim 7, wherein,
selecting webpages matching the search request from the plurality of webpages based on the core information corresponding to each webpage comprises:
detecting whether the core proper noun and the core verb is contained in content of the webpage;
in response to detecting that the core proper noun and the core verb is contained in the content of the webpage, detecting whether a term frequency-inverse document frequency (TF-IDF) of the core verb is greater than a first preset threshold;
in response to detecting that the TF-IDF of the core verb is greater than the first preset threshold, detecting whether the core proper noun is consistent with the search request; and
in response to detecting that the core proper noun is consistent with the search request, determining that the webpage matches the search request.

10. The apparatus according to claim 8, wherein performing the cluster analysis on the webpages matching the search request comprises:
detecting whether core proper nouns of webpages participating in a cluster are consistent;
in response to detecting that the core proper nouns of the webpages participating in the cluster are consistent, obtaining a combined similarity of the core concept words and the core verbs in the webpages participating in the cluster based on a cluster metric function; and
in response to detecting that the combined similarity is greater than a second preset threshold, clustering the webpages participating in the cluster.

11. A non-transitory computer-readable storage medium, having one or more programs stored thereon, when the one or more programs are executed by an apparatus, the apparatus performs following actions:
obtaining a plurality of webpages according to a search request of a user, performing proper noun recognition and word segmentation processing on a title of each webpage to obtain part-of-speech and extended information corresponding to a word segmentation result;
determining core information corresponding to each webpage according to the part-of-speech and extended information corresponding to the word segmentation result, wherein the core information further comprises a core concept word, a core proper noun and a core verb;
selecting webpages matching the search request from the plurality of webpages based on the core information corresponding to each webpage; and
performing cluster analysis on the webpages matching the search request to generate a search result comprising a plurality of categories of webpages, and displaying the searching result to the user by category; and
displaying the core concept word and the core verb as a title of the search result to the user.

12. The storage medium according to claim 11, wherein, the part-of-speech comprises a noun, a verb, an adverb, or a proper noun, the extended information comprises a proper noun category, indication analysis of a proper noun, or word field analysis, the word field analysis is configured to analyze which application scenario or which vertical website a word is to be used in a current context.

13. The storage medium according to claim 11, wherein,
selecting webpages matching the search request from the plurality of webpages based on the core information corresponding to each webpage comprises:
detecting whether the core proper noun and the core verb is contained in content of the webpage;
in response to detecting that the core proper noun and the core verb is contained in the content of the webpage, detecting whether a term frequency-inverse document frequency (TF-IDF) of the core verb is greater than a first preset threshold;
in response to detecting that the TF-IDF of the core verb is greater than the first preset threshold, detecting whether the core proper noun is consistent with the search request; and
in response to detecting that the core proper noun is consistent with the search request, determining that the webpage matches the search request.

14. The storage medium according to claim 12, wherein,
selecting webpages matching the search request from the plurality of webpages based on the core information corresponding to each webpage comprises:
detecting whether the core proper noun and the core verb is contained in content of the webpage;
in response to detecting that the core proper noun and the core verb is contained in the content of the webpage, detecting whether a term frequency-inverse document frequency (TF-IDF) of the core verb is greater than a first preset threshold;
in response to detecting that the TF-IDF of the core verb is greater than the first preset threshold, detecting whether the core proper noun is consistent with the search request; and
in response to detecting that the core proper noun is consistent with the search request, determining that the webpage matches the search request.

15. The storage medium according to claim 13, wherein performing the cluster analysis on the webpages matching the search request comprises:
detecting whether core proper nouns of webpages participating in a cluster are consistent;
in response to detecting that the core proper nouns of the webpages participating in the cluster are consistent, obtaining a combined similarity of the core concept words and the core verbs in the webpages participating in the cluster based on a cluster metric function; and
in response to detecting that the combined similarity is greater than a second preset threshold, clustering the webpages participating in the cluster.

* * * * *